United States Patent [19]
Karwacki

[11] Patent Number: 5,978,141
[45] Date of Patent: Nov. 2, 1999

[54] OPTICAL MIRROR PARTICULARLY SUITED FOR A QUANTUM WELL MIRROR

[75] Inventor: Francis A. Karwacki, Lansdale, Pa.

[73] Assignee: The United States of America as represented by the Secretary of the Navy, Washington, D.C.

[21] Appl. No.: 08/971,818

[22] Filed: Nov. 17, 1997

[51] Int. Cl.$^6$ ..................................................... G02B 1/10
[52] U.S. Cl. .......................... 359/586; 359/584; 359/589; 372/96; 372/99
[58] Field of Search ..................................... 359/584, 585, 359/586, 587, 589; 372/96, 99

[56] References Cited

U.S. PATENT DOCUMENTS 5,557,627  9/1996  Schneider, Jr. et al. .................. 372/46
5,719,892  2/1998  Jiang et al. ................................ 372/45

Primary Examiner—Cassandra Spyrou
Assistant Examiner—Craig Curtis
Attorney, Agent, or Firm—Ron Billi

[57] ABSTRACT

An optical mirror comprised of a stack of film pairs of alternating layers of high and low indices of refraction materials is disclosed. The optical mirror may further comprise a non-polished substrate and provides the desired reflectivity for the use in the operation of a quantum well mirror that provides an optical bias for a ring laser gyroscope.

10 Claims, 6 Drawing Sheets

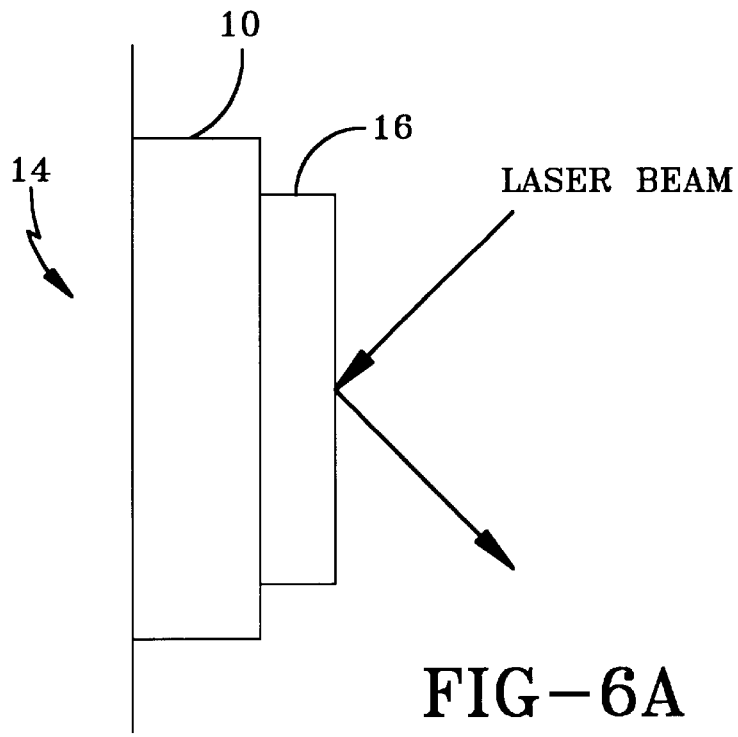
FIG-6A
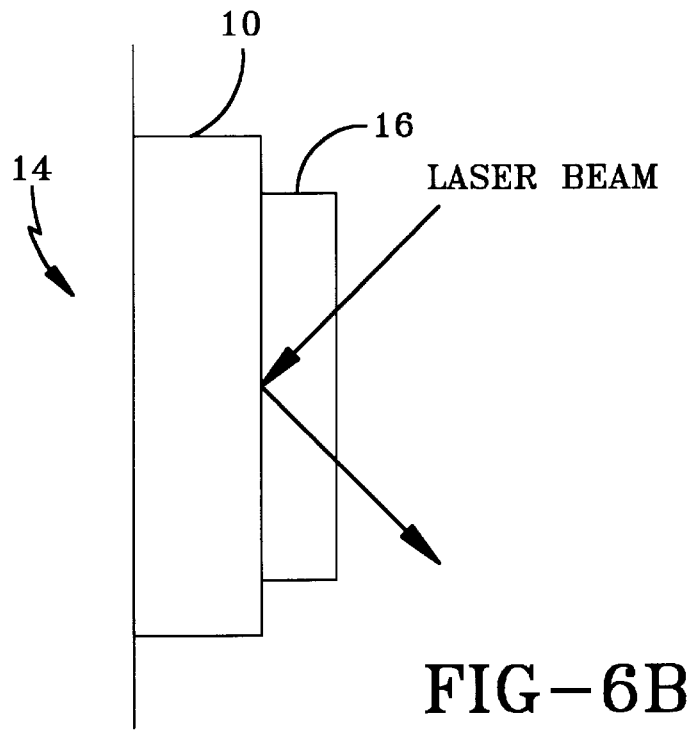
FIG-6B
FIG-6

OPTICAL MIRROR PARTICULARLY SUITED FOR A QUANTUM WELL MIRROR

BACKGROUND OF THE INVENTION

1.0 Field of the Invention

The present invention relates to a ring laser gyroscope and, more particularly, to an optical mirror comprised of a stack of film pairs of alternating layers of high and low indices of refraction and used in a quantum well mirror (QWM) for a ring laser gyroscope.

2.0 Description of the Prior Art

Ring laser gyroscopes may suffer from a lock-out condition which is prevented by means of a mechanical dither spring which exists in prior art dual beam ring laser gyroscopes (RLG). The dither spring serves as a means of providing an artificial bias to the ring laser gyroscopes (RLG) at low input rates. At these low input rates and with no dither spring backscattered light from the mirrors of the RLG causes a locking of the two counter rotating beams of the RLG and hence no output. The dither spring oscillates at a set frequency rotating the RLG over a small angle. This oscillation produces an artificial input rate to the RLG keeping the RLG from locking its two beams when the externally applied input rate goes below the deadband lock-in frequency. The mechanical dither spring is made from Invar and is typically circular in design with spokes extending from a central inner ring to an outer ring. A piezo element is attached to each spoke and a voltage is applied to cause the desired oscillatory motion. The dither spring has attendant drawbacks due to its mechanical aspect.

Quantum well mirrors (QWM) may also be used to provide an optical bias so as to advantageously keep a ring laser gyroscope (RLG) out of its lock-in region. A mirror formed on dielectric materials ($SiO_2$ and $TiO_2$) commonly forms part of a quantum well mirror. The dielectric materials ($SiO_2$ and $TiO_2$) of the mirror are deposited on a polished substrate comprising, for example, quartz. The substrate requires polishing of the substrate so that its thickness is less than 1 Å, before the dielectric materials may be deposited. For such conditions, the yields of the fabrication process based on dielectric materials are limited because of this required polishing. It is desired that materials other than dielectric materials be utilized to provide for a mirror particularly suited to form part of a quantum well mirror (QWM) for use in a ring laser gyroscope so as to eliminate the need of a highly polished substrate.

OBJECTS OF THE INVENTION

It is a primary object of the present invention to provide an optical mirror devoid of both dielectric materials and a highly polished substrates and that may be used to form part of a quantum well mirror (QWM) which, in turn, may be used in a ring laser gyroscope.

It is another object of the present invention to provide for semiconductor materials that may be deposited on a substrate that requires no polishing and that are arranged to serve as an optical mirror for use with a quantum well mirror.

It is a further object of the present invention to provide for an optical mirror that is particularly suited to operatively interact so as to intercept the laser and have the angle of incident leaving the optical mirror to be the same as that intercepting the optical filter.

A further object of the present invention is to provide for an optical mirror formed of material layers of high and low indices of refraction components composed of two materials $Al_x\ Ga_{x-1}$ As and AlAS with the Al concentration set to eliminate absorption of incident light at a wavelength of 6328 Å.

SUMMARY OF THE INVENTION

The present invention is directed to an optical mirror comprised of semiconductor materials particularly suited to serve as part of a quantum well mirror (QWM) which operatively interacts with a ring laser gyroscope (RLG).

In one embodiment, the optical mirror comprises a stack of film pairs of fifty-five (55) alternating layers of high and low indices of refraction of $Al_{0.59}\ Ga_{0.41}$, and As and AlAs materials, respectively, with each layer having an optical thickness of a quarter wavelength with the wavelength being 6328 Å.

In another embodiment, the optical mirror comprises a stack of film pairs in the range from 15 to 20 alternating layers of high and low indices of refraction of $Al_{0.59}\ Ga_{0.41}$ and As and AlAs materials, respectively, with each layer having an optical thickness of a quarter wavelength with the wavelength being 6328 Å. The AlAs layers being subjected to oxygenation so as to provide a refractive index of 1.6.

BRIEF DESCRIPTION OF THE DRAWINGS

These and other objects, features and advantages of the invention, as well as the invention itself, will become better understood by reference to the following description when considered in conjunction with the accompanying drawings, wherein like reference numbers designate identical or corresponding parts throughout and wherein:

FIG. 6 is composed of FIGS. 6(A) and 6(B) that respectively illustrate the operative response of the quantum well mirror of FIG. 4 in its non-excited state and its excited state.

DETAILED DESCRIPTION OF THE PREFERRED EMBODIMENTS

Figure 1:
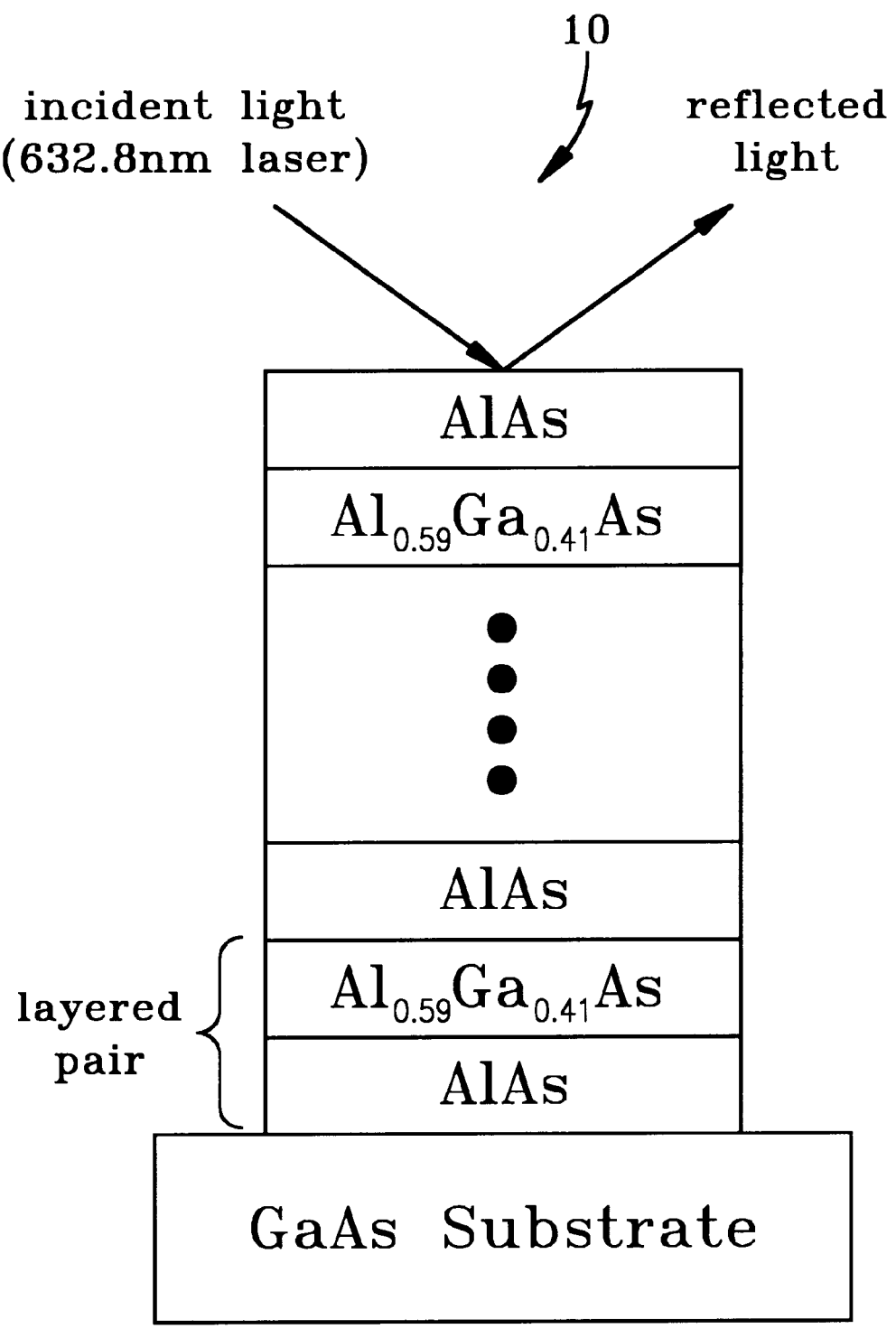
FIG. 1 is a schematic of an optical mirror in accordance with the present invention.

With reference to the drawings, FIG. 1 illustrates an optical mirror 10 particularly suited to form part of a quantum well mirror (QWM) that provides an optical bias to keep a ring laser gyroscope (RLG) out of its lock-in region.

The optical mirror 10 of FIG. 1 is particularly suited to operatively interact with a laser of a particular operating frequency. As seen in FIG. 1, light from a 6328 Å laser is directed at the surface of the optical mirror 10. As the light enters and travels through the layered pairs, to be further described, of the optical mirror 10, a portion of the light is reflected at each interface of the layered pairs. As the light travels further into the stack of layered pairs comprising the optical mirror 10, the remaining light is reflected. The reflected light returns the top surface of the optical mirror 10 leaving the top surface at the same angle of the incident light as it entered. Accordingly, the angle of the reflected laser is the same as the angle of the incident laser. This property is particularly advantageous for use with a quantum well mirror (QWM).

The optical mirror 10 comprises layered-pairs of $Al_{0.59}Ga_{0.41}As/AlAs$ materials deposited in, for one embodiment, a fifty-five (55) layered-pair stack. The materials may be deposited by appropriate means such as provided by Molecular Oxide Chemical Vapor Deposition (MOCVD) techniques. The number of layered-pairs is predetermined, in one embodiment, to provide the reflectivity necessary to operatively interact with a ring laser gyroscope that is operational at a wavelength of 6328 Å. The number of layered pairs that is desired to produce this reflectivity is 55. This number was realized because the difference in the refractive index numbers between the two semiconductor materials $Al_{0.59}Ga_{0.41}As$ and AlAs was low. The desired reflectivity is a function of the index of refraction of the component layers. As seen in FIG. 1, when the optical mirror 10 is used by itself free of the QWM, the first or upper layer that intercept the light ray is comprised of AlAs, having under it the second layer of $Al_{0.59}Ga_{0.41}As$. The first and second layers form thin-film pairs and all of the pairs are stacked on a substrate comprising GaAs that need not be polished. The greater the difference in the index of refraction of the layered-pairs, the smaller the number of layered-pairs that is necessary to provide the correct reflectivity. In addition to the reflectivity, the Al concentration is predetermined so as to keep absorption of the laser having an operating wavelength of 6328 Å below 50 ppm. This absorption number is a design goal for the ring laser gyroscope, to be further described, particularly suited for use with the optical mirror 10. The absorption number is predetermined so as to keep the sum total for the absorption below a prescribed value which if exceeded would extinguish the lasing action in the ring laser gyroscope in which the optical mirror 10 finds use.

A direct correlation exists between the Al concentration and the index of refraction of the $Al_xGa_{x-1}As$ layer. As will be further described, care must be taken in order to maintain the index difference between the layer-paired combination. More particularly, one must also consider the effect of the Al concentration on the surface morphology. The higher the Al concentration, the greater the chance for the creation of nucleation sites on the mirror's surface. This increase in the number of nucleation sites would disadvantageously increase the density of scatters on the mirror surface. This would, in turn, undesirably increase the deadband lock-in region of the ring laser gyroscope related to the present invention.

The film pair of alternating layers of the optical mirror 10 is selected to be of the III-V compounds, and in particular, AlAs and $Al_xGa_{x-1}Al$ are selected. These compounds form cubic crystals, zinc-blende arrangements at normal pressure. These crystals are also isotropic for crystal density, conductivity and refractive index. The lattice parameters are $a_{ALAs}=$ 5.66139 Å and $a_{ALGaAs}=5.65330+0.00809x$ Å where x is the concentration of Al. These lattice constants allow for ideal growth conditions on a GaAs substrate whose lattice constant is $a_{GaAs}=5.65330$. In addition, the refractive index difference between $Al_xGa_{x-1}As/AlAs$ is significant enough to produce highly reflective mirrors with a reasonable amount of layered pairs. The Al concentration of the $Al_xGa_{x-1}As$ compound may also be adjusted to reduce the absorption of laser light for RLG operation.

In the practice of the invention, an analysis was performed for the multi-layered $Al_xGa_{x-1}As/AlAs$ optical mirror 10 using standard thin film techniques. The refractive indices for the III-V materials were selected based on the Al concentration needed to minimize absorption, >50%. To achieve high reflectivity, a thin-film pair of alternating layers of high and low index of refraction $Al_xGa_{x-1}As/AlAs$ materials was used in the design analysis. Each layer corresponded to an optical thickness of a quarter wavelength, with the wavelength set to 6328 Å. This selection ensures for constructive interference for the reflected beam for maximum reflectivity. Based on the optical mirror 10 analysis, an $Al_xGa_{x-1}As/AlAs$ multi-layered stack of 55 layers was fabricated. This semiconductor mirror was measured for reflectivity against a standard dielectric ring laser gyroscope (RLG) mirror having the highly polished substrate discussed in the "Background" section. The reflectivity of the semiconductor optical mirror 10 of FIG. 1 was 0.7% better than the reflectivity of the prior art dielectric RLG mirror. The calculated reflectivity for the semiconductor mirror was 99.97%. The semiconductor optical mirror 10 of the present invention was also placed in a V-cavity laser, known in the art, to determine if lasing would be produced. This was done to determine if the absorption losses were too great to sustain lasing. After a minor adjustment for the alignment of the optical mirror 10, the cavity lased. It is expected that absorption loss will even be below the calculated 82 ppm associated with a laser having an operating wavelength of 6328 Å. An additional loss in reflectivity and an increase in absorption loss also occurred because the top surface of the semiconductor mirror 10 was coated with GaAs as a protective layer. A surface scan was also performed on the semiconductor optical mirror 10 to determine its surface characteristics. The surface roughness was 1.37 Å rms. This is slightly greater than the polished substrates used in the deposition of standard prior art dielectric mirrors, typically <1.0 Å rms. The surface roughness represents the flatness of the cleaved unpolished substrate (GaAs—see FIG. 1) surface used in the practice of the present invention. The measurement of the scattering center produced a value of 92.3. The scattering center scan provides an acceptable grade for an inertial instrument such as those associated with the present invention.

Figure 2:
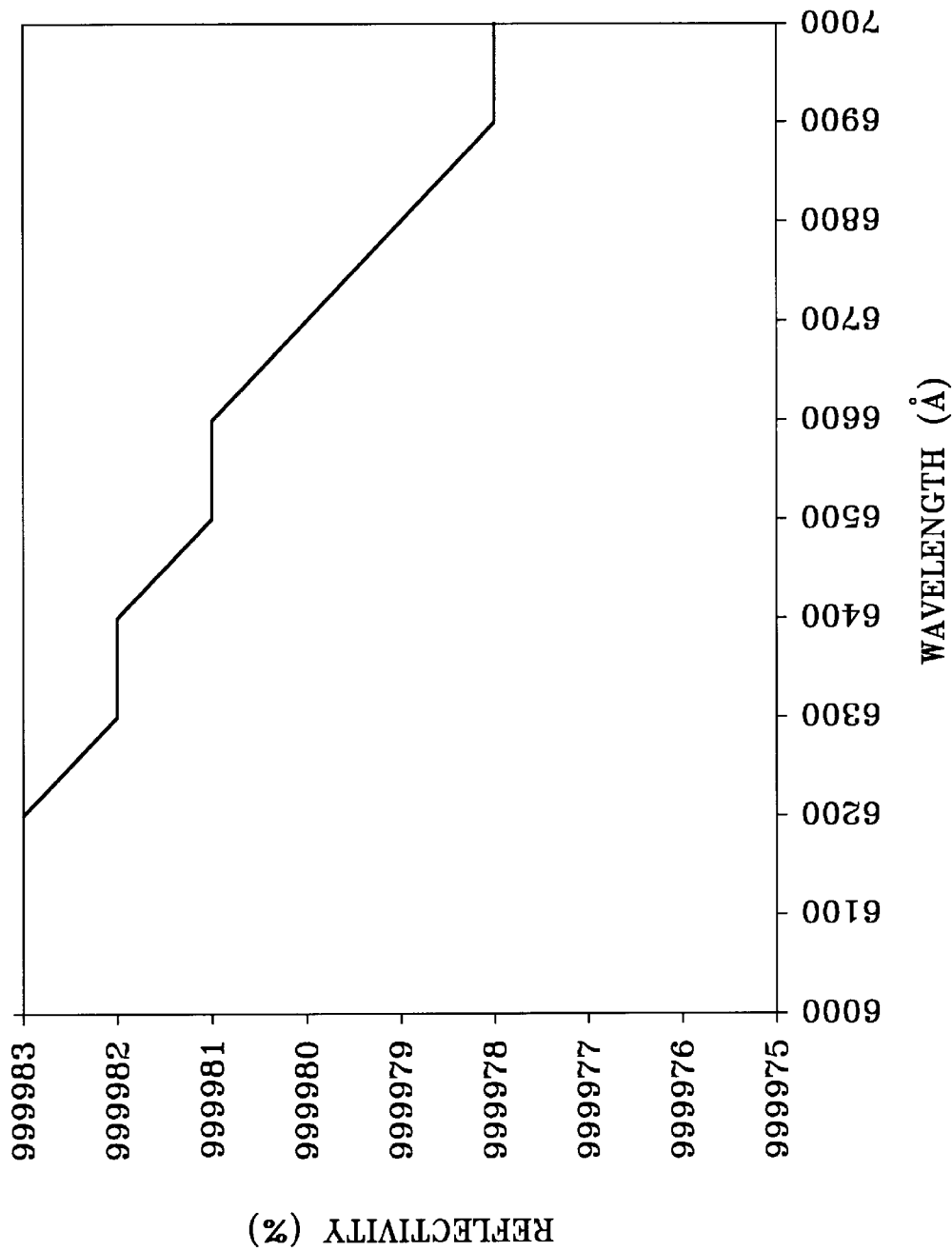
FIG. 2 illustrates the reflectivity factor of one embodiment of the optical mirror 10.
Figure 3:
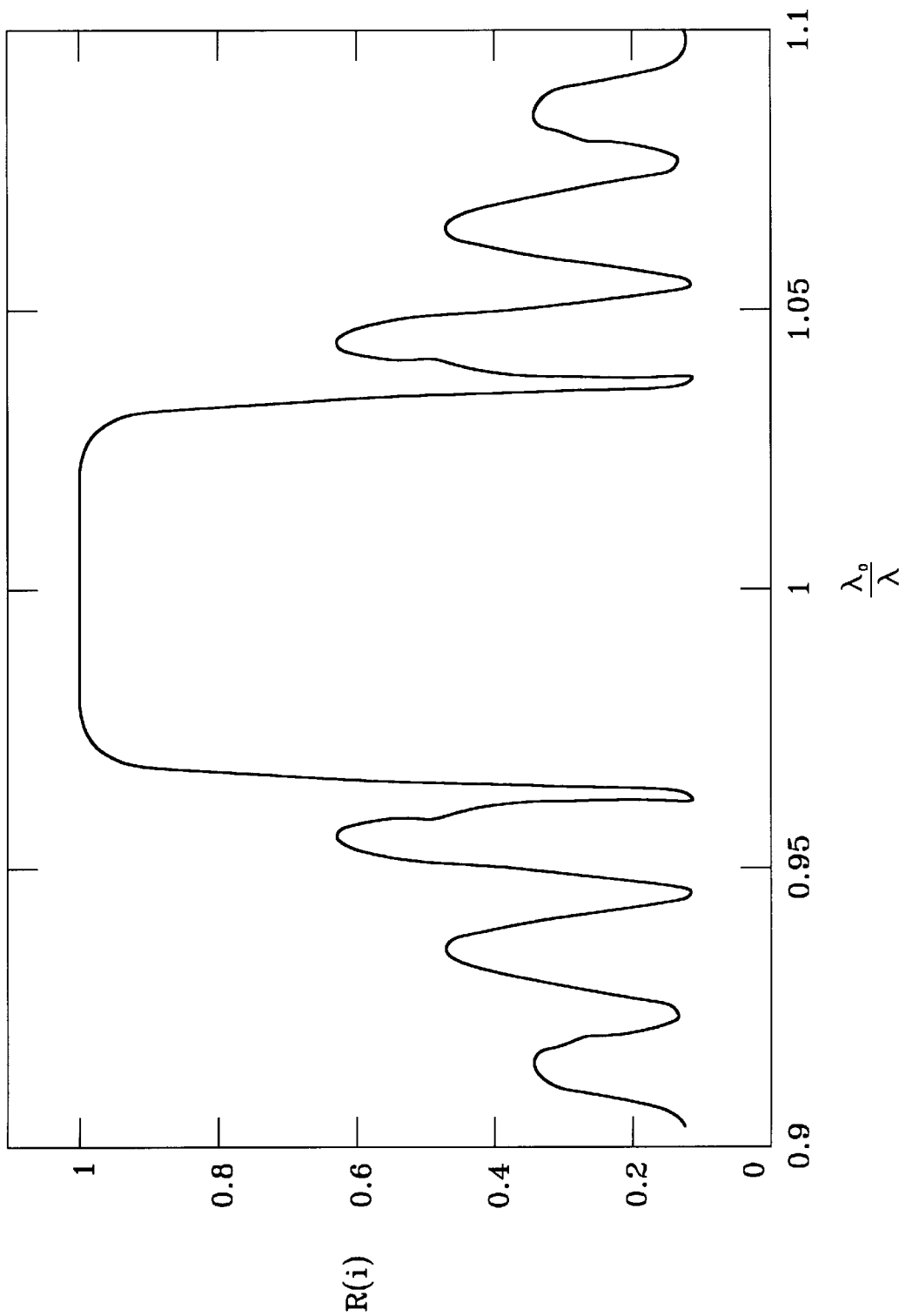
FIG. 3 illustrates the reflectivity vs wavelength response of the optical mirror of FIG. 1.

From a further analysis not confirmed by fabrication, it is contemplated that the oxygenation of the AlAs compound reduces the number of alternating layers of the optical mirror 10. More particularly, oxygenation of the AlAs layer drops its refractive index to 1.6 from 3.14. This relatively large change in the index allows the fabrication of the optical mirror 10 to be performed by the use of 15 to 20 layered pairs with a higher reflectivity than produced by the current design (the prior art dielectric mirror with the highly polished substrate) 99.99981% as may be seen in FIG. 2. Further, FIG. 3 illustrates a reflectance curve of the optical mirror 10 having an X-axis in which the center wavelength $\lambda_o$ approaches 6328 Å. The optical mirror 10 in one application may serve as a quantum well mirror (QWM) known in the art.

Figure 4:
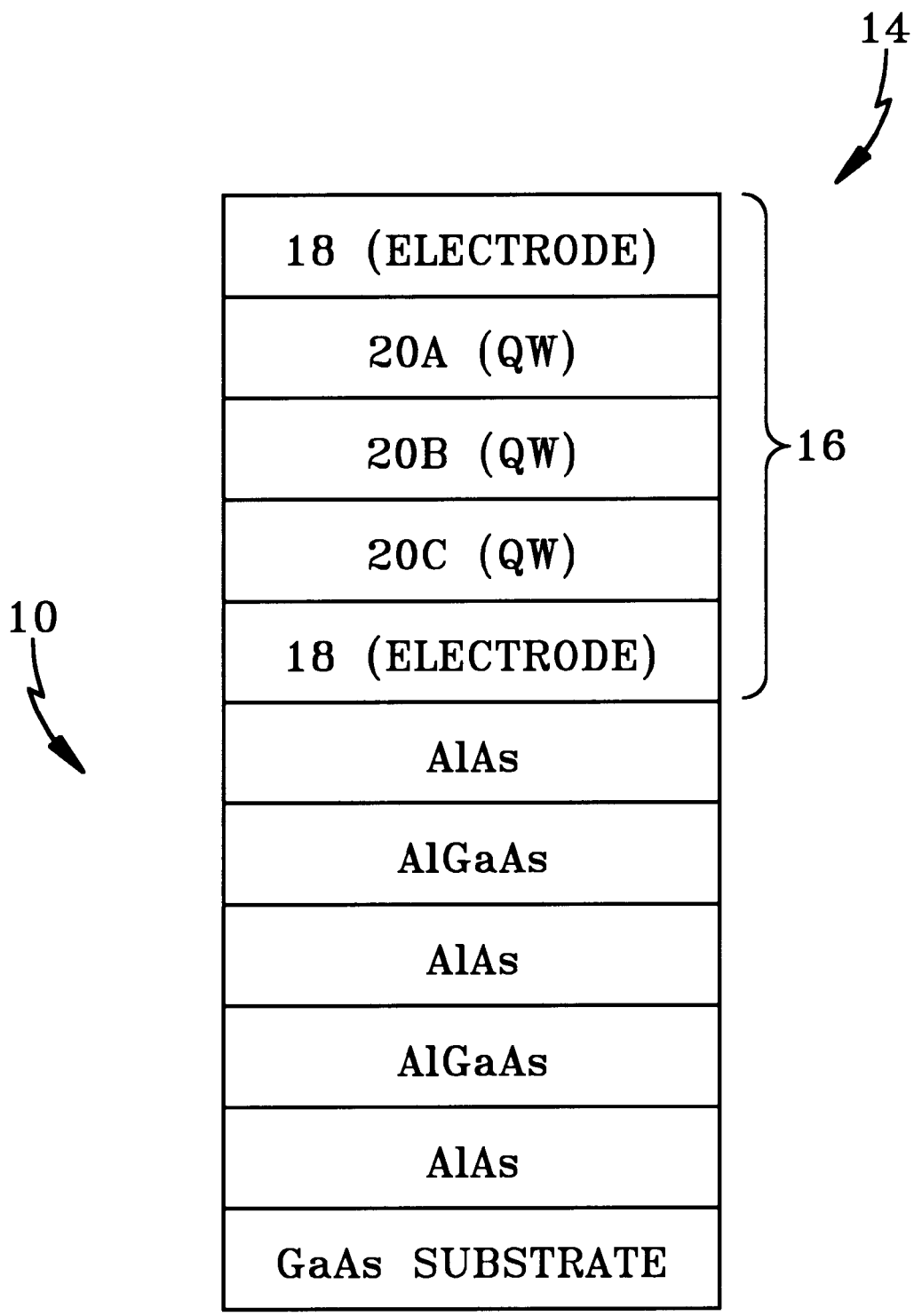
FIG. 4 illustrates a quantum well mirror (QWM) employing the optical mirror of the present invention and used in a ring laser gyroscope (RLG).

In general, a QWM is composed of two structures, a back surface mirror and a front surface filter which may be further described with reference to FIG. 4. FIG. 4, for a typical embodiment, illustrates a quantum well mirror (QWM) 14 comprising a front surface filter 16 and a back surface mirror which is the optical mirror 10 of FIG. 1. The front surface filter 16 comprises, in a sequential arrangement, a first electrode 18, a first quantum well (QW) 20A, a second quantum well (QW) 20B with a different thickness or Al concentration than the first quantum well 20A, a third quantum well (QW) 20C with a different thickness or Al concentration than first or second quantum well 20A or 20B, and a second electrode 18. The quantum wells (QWs) 20A, 20B and 20C comprise alternating high and low index of refraction layers. The high index of refraction layers of the quantum wells (QWs) 20A, 20B and 20C are made of materials exhibiting the Quantum Confined Stark effect (known in the art) in quantum wells at the operating wavelength of the RLG which may be 6328 Å previously described with reference to FIG. 1. The high and low index of refraction materials of the quantum wells (QWs) 20A, 20B and 20C are deposited to form an optical edge filter. Deposited below the front edge filter 16, as seen in FIG. 4, is a series of high and low index of refraction materials which form a highly reflective optical mirror 10.

The purpose of the QWM is to optically bias the ring laser gyroscope (RLG) out of its lock-in region. This is accomplished by shifting the apparent plane of reflection within the QWM 14 by applying a voltage to the electrodes 18 placed across the front surface filter 16, as shown in FIG. 4.

In addition, the QWM 14 provides a reduction in random walk error, known in the art, which results from the mechanical dither drive applied to the ring laser gyroscope (RLG). The dither contribution to the random walk of the RLG is given by:

$$RW = \frac{\omega_L}{\sqrt{SF2\pi\omega_d}} \quad (1)$$

where $\omega_L$ is the lock-in frequency of the ring laser gyroscope (RLG), SF is the Scale Factor of the ring laser gyroscope (RLG) and $\omega_d$ is the dither frequency. A typical body-dithered RLG has a dither frequency of 359–500 Hz. An electro-optically modulated semiconductor structure, such as that provided by the present invention, can easily attain a modulation frequency of 100 MHz. For an increase in the dither frequency from 375 Hz to 100 MHz, the random walk induced by dither is decreased by a factor of 516. This potentially decreases the random walk of the ring laser gyroscope (RLG) to a very useable factor.

The QWM 14 provides an optical bias by moving its apparent plane of reflection back and forth. This is similar to a condition, known in the art, of moving the position of the corner mirrors back and forth by using a piezoelectric device. As is known in the art, the QWM 14 provides a virtual reflecting surface that can be moved back and forth without physical motion of the structure of the QWM 14. The effect of movement provides an optical bias of the ring laser gyroscope keeping it out of its lock-in region and is realized by modulating the index of refraction of alternating layers of the front surface filter 16 of the QWM 14. The relative motion of the surfaces of the QWM 14 is controlled so that the total optical path length around the RLG is held at a fixed value at all times. Although the path length is held constant, the apparent relative motion of the reflecting surfaces of the QWM 14 causes an apparent rotation, which keeps the RLG out of its lock-in region.

Figure 5:
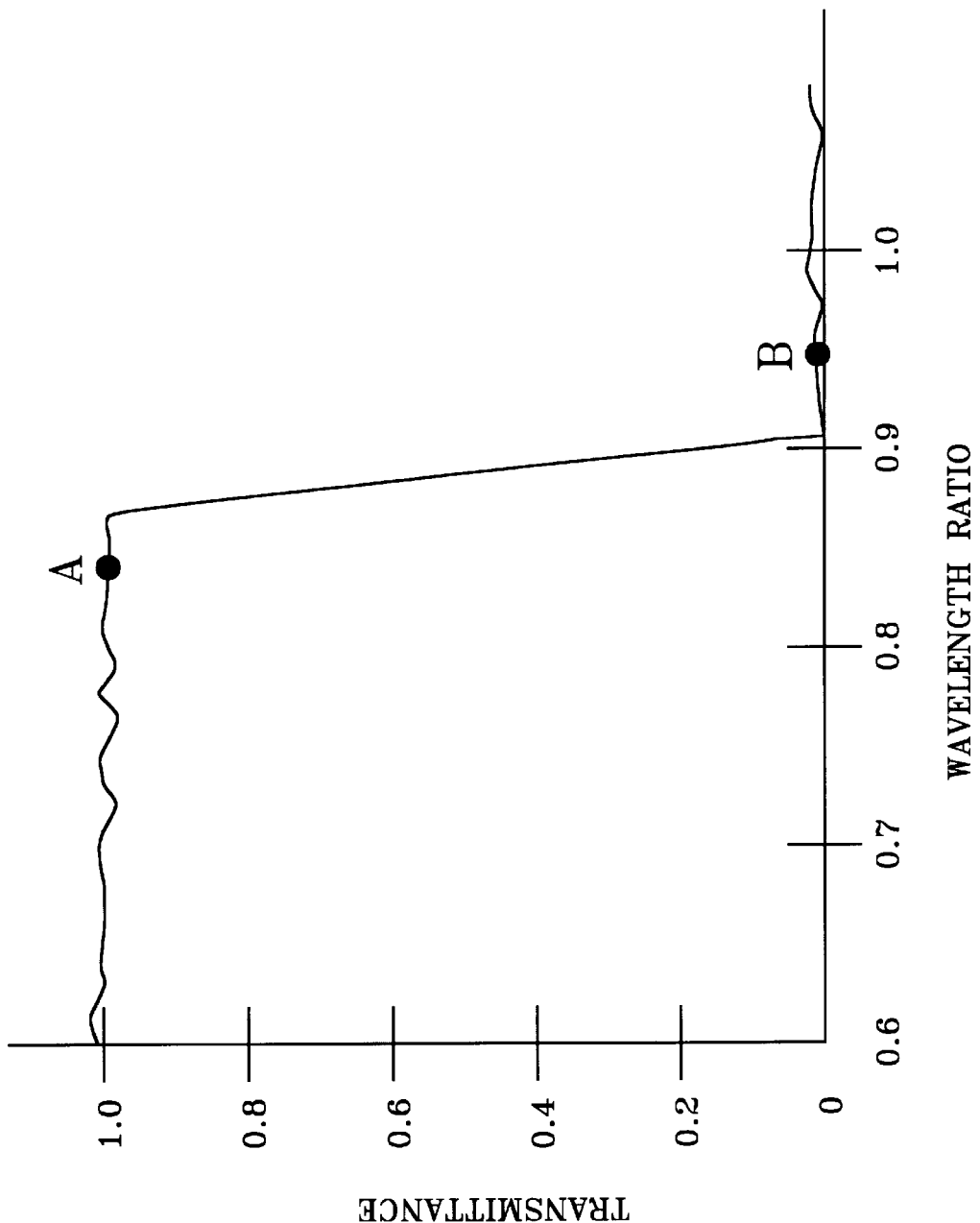
FIG. 5 illustrates the transmittance vs wavelength response of the quantum well mirror of FIG. 4.

The QWM 14 is responsive to the application of an electric field applied to the electrodes 18 of FIG. 4. When the quantum well optical filter structure 14 is not energized with an electric field, the structure is tuned to be an optical edge filter of high transmission, such as that identified by A in the filter response of FIG. 5. Therefore, the first reflection of the incident laser light occurs at the surface of the highly reflective mirror structure located below the quantum wells. When the quantum well optical filter structure 14 is energized with an electric field, the structure becomes detuned and the first reflection of the incident laser light occurs at the top of the optical mirror 10 and may be further described with reference to FIG. 6.

FIG. 6 is composed of FIGS. 6(A) and 6(B), wherein FIG. 6(A) illustrates the response of the QWM 14 in its un-energized state and, conversely, FIG. 6(B) illustrates the response of the QWM 14 in its energized state.

As seen in FIG. 6(A), when the QWM 14 is un-energized an impinging laser beam is reflected by the front surface filter 16. Conversely, as seen in FIG. 6(B), when the QWM 14 is energized an impinging laser beam passes through the front surface filter 16 and is reflected by the optical mirror 10 of the present invention. From both FIGS. 6(A) and 6(B), it is seen that the angle of incidence and the angle of reflection are the same for the impinging laser beam. An oscillatory signal applied to the quantum well structure 14, via the electrodes 18, causes a non-reciprocal phase modulation to the counter propagating laser beams in the cavity of an RLG.

In the practice of the present invention related to the use of the optical mirror 10 as part of the QWM 14, an $Al_xGa_{x-1}As/AlAs$ multiple quantum well structure was fabricated as a first step in determining the ability of the quantum well to provide the characteristics needed to operate as a front surface filter 16 of a QWM 14 of FIG. 4. The device was fabricated using a Molecular Beam Epitaxy (MBE) apparatus. The front surface filter 14 of the quantum well structure was initially surfaced scanned after fabrication to determine its suitability as a mirror for gyroscope operation since the laser beam is reflected off the front surface when the QWM 14 filter is operational. More particularly, as seen in FIG. 6(B), when the QWM 14 is energized or operational, the laser beam reflects of f the first surface of the optical mirror 10.

Surface flatness of the first reflecting surface of the front surface filter 16 was measured followed by a measurement of scattering centers per unit area. The surface flatness was 2.67 Å rms and the scattering center number was 164.2. The surface flatness and scattering center numbers provide a means of determining the suitability of the front surface filter 16 of FIG. 4 for use in an RLG. The 2.67 Å rms surface flatness number is the flatness produced by the properties of the substrate. The substrate was an off-the-shelf item chemically cleaned before depositing the materials AlAS and AlGaAs. The scattering center number is a relative number and helps to designate a class of mirrors. An RLG with a scattering center number of 164.2 so as that achievable by the present invention has a lock-in band of=1600 deg/hr. This number does not present a serious problem because the dither frequency of the QWM 14 is in the 100's of megahertz. The contribution to the random walk error due the dither is effectively reduced by 541. The dither contribution is proportional to the lock-in frequency and inversely proportional to the dither drive frequency (see Equation 1). It is expected that the scattering center number was somewhat high because the substrate was of a poor quality.

In a further practice of the present invention of secondary importance, a calculation was also performed to determine how to decouple the forward and backscattered components of the two primary beams in the RLG cavity. The analysis showed that the forward component can be reduced to zero if the argument of the zero order Bessel function can be driven to zero. The backscattered component may be reduced by the dither drive amplitude. The higher the drive frequency, the lower the backscattered component. This analysis also provided the amount of movement required to drive the QWM 14 for the proper optical biasing of the ring laser gyroscope related to the present invention. The calculated distance was less than a wavelength.

It should now be appreciated that the practice of the present invention provides for an optical mirror that is particularly suited to form part of a quantum well mirror (QWM) that provides an optical bias to keep a ring laser gyroscope (RLG) out of its lock-in region. The optical mirror may be deposited on an unpolished substrate. The optical mirror has mirror characteristics and produces a mirror with high reflectivity, low absorption losses and excellent surface characteristics to support lasing and low lock-in rates for ring laser gyroscope operations. In addition, the optical mirror of the present invention does not require realignment of its mirror with the ring laser gyroscope laser cavity after attachment to the ring laser gyroscope structure.

It is understood that the invention is not limited to the specific embodiments herein illustrated and described but may be otherwise without departing in the spirit and scope of the invention.

I claim:

1. An optical mirror for intercepting a light beam and providing a reflected beam therefrom and comprising a stack of film pairs of fifty-five (55) alternating layers of high and low indices of refraction of $Al_{0.59} Ga_{0.41}$ As and AlAs materials in which the Al thereof has a concentration of greater than 50 per cent, respectively, with each layer having an optical thickness of a quarter wavelength with the wavelength being 6328 Å, said optical mirror providing constructive interference for said reflected beam and keeping the absorption at the operating wavelength of 6328 Å below 50 Rpm.

2. The optical mirror according to claim 1 further comprising a substrate of GaAs.

3. The optical mirror according to claim 1, wherein said optical mirror has an upper surface with a flatness of about 1.37 Å rms and a scattering center number of about 92.3.

4. An optical mirror for intercepting a light beam and providing a reflected beam therefrom and comprising a stack of film pairs in the range from 15 to 20 alternating layers of high and low indices of refraction of $Al_{0.59} Ga_{0.41}$ As and AlAs materials in which the Al thereof has a concentration of greater than 50 percent, respectively, with each layer having an optical thickness of a quarter wavelength with the wavelength being 6328 Å, said AlAs layers being subjected to oxygenation so as to provide a refractive index of 1.6 therefor, said optical mirror providing constructive interference for said reflected beam and keeping the absorption at the operating wavelength of 6328 Å below 50 ppm.

5. The optical mirror according to claim 4 further comprising a substrate of GaAs.

6. The optical mirror according to claim 4, wherein said optical mirror has an upper surface with a flatness of about 1.37 Å rms and a scattering center number of about 92.3.

7. A quantum well mirror (QWM) that provides an optical bias to keep a ring laser gyroscope (RLG) out of its lock-in region, said quantum well mirror comprising:
   (a) a front surface filter for intercepting a light beam and providing a reflected beam therefrom; and
   (b) an optical mirror located under said front surface filter and comprising a stack of film pairs of fifty-five (55) alternating layers of high and low indices of refraction of $Al_{0.59} Ga_{0.41}$ As and AlAs materials in which the Al thereof has a concentration of greater than 50 percent, respectively, with each layer having an optical thickness of a quarter wavelength with the wavelength being 6328 Å, said optical mirror providing constructive interference for said reflected beam and keeping the absorption at the operating wavelength of 6328 Å below 50 ppm.

8. The quantum well mirror (QWM) according to claim 7 further comprising a substrate of GaAs for said optical mirror.

9. The quantum well mirror (QWM) according to claim 1, wherein said optical mirror has an upper surface with a flatness of about 1.37 Å rms and a scattering center number of about 92.3.

10. A quantum well mirror (QWM) that provides an optical bias to keep a ring laser gyroscope (RLG) out of its lock-in region, said quantum well mirror comprising:
   (a) a front surface filter comprising a sequential arrangement of:
      (i) a first electrode;
      (ii) a first quantum well having a first thickness and a first Al concentration and comprising alternating high and low indices of refraction layers with the high index of refraction layers made up of materials exhibiting a Quantum Confined Stark effect;
      (iii) a second quantum well having a second thickness and a second Al concentration with either said second thickness being different than said first thickness or said second Al concentration being different than said first Al concentration, said second quantum well comprising alternating high and low indices of refraction layers with the high index of refraction layers made up of materials exhibiting a Quantum Confined Stark effect;
      (iv) a third quantum well having a third thickness and a third Al concentration with either said third thickness being different than said first or second thickness or said third Al concentration being different than said first or second Al concentration, said third quantum well comprising alternating high and low indices of refraction layers with the high index of refractory layers made up of materials exhibiting a Quantum Confined Stark effect; and
      (v) a second electrode; and
   (b) an optical mirror located under said front surface filter and comprising a stack of film pairs of fifty-five (55) alternating layers of high and low indices of refraction of $Al_{0.59} Ga_{0.41}$ As and AlAs materials in which the Al thereof has a concentration greater than 50 percent, respectively, with each layer having an optical thickness of a quarter wavelength with the wavelength being 6328 Å and keeping the absorption at the operating wavelength of 6328 Å below 50 ppm.

* * * * *